US008843540B2

(12) United States Patent
Wen

(10) Patent No.: US 8,843,540 B2
(45) Date of Patent: Sep. 23, 2014

(54) CIRCUIT AND METHOD FOR IMPLEMENTING FFT/IFFT

(75) Inventor: Ziyu Wen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 519 days.

(21) Appl. No.: 13/258,684

(22) PCT Filed: Dec. 11, 2009

(86) PCT No.: PCT/CN2009/075525
§ 371 (c)(1),
(2), (4) Date: Sep. 26, 2011

(87) PCT Pub. No.: WO2010/108371
PCT Pub. Date: Sep. 30, 2010

(65) Prior Publication Data
US 2012/0016923 A1 Jan. 19, 2012

(30) Foreign Application Priority Data

Mar. 27, 2009 (CN) .......................... 2009 1 0106193

(51) Int. Cl.
*G06F 15/00* (2006.01)
*G06F 17/14* (2006.01)

(52) U.S. Cl.
CPC .................. *G06F 17/142* (2013.01)
USPC ......................................... 708/404; 708/409

(58) Field of Classification Search
CPC ..... G06F 17/142; G06F 7/768; G06F 17/141; G06F 9/30014; G06F 9/30036; G06F 17/14; G06F 17/10; H04L 27/265; H04L 27/2628
USPC ................................. 708/404, 409
See application file for complete search history.

(56) References Cited

U.S. PATENT DOCUMENTS 5,717,620 A 2/1998 Williams
6,122,703 A * 9/2000 Nasserbakht ................. 708/404
(Continued)

FOREIGN PATENT DOCUMENTS

CN 1188939 A 7/1998
CN 101083643 A 12/2007
(Continued)

OTHER PUBLICATIONS

International Search Report in international application No. PCT/CN2009/075525, mailed on Mar. 18, 2010.
English Translation of the Written Opinion of the International Search Authority in international application number: PCT/CN2009/075525, mailed on Mar. 18, 2010.

*Primary Examiner* — Tan V. Mai
(74) *Attorney, Agent, or Firm* — Oppedahl Patent Law Firm LLC

(57) ABSTRACT

A circuit and a method for implementing Fast Fourier Transform (FFT)/Inverse Fast Fourier Transform (IFFT) are provided. The method includes: determining the number m of iterations, depth d1 of the first and second Random Access Memories (RAMs), depth d2 of a Read Only Memory (ROM); storing the first and second n/2 parts of the input data to be Transformed into the second and first RAMs respectively; performing the iterative butterfly operations m times; in the first iteration, reading the first and second RAMs in a reverse bit order, writing the results of the even-numbered butterfly operations into the first RAM, writing the results of the odd-numbered butterfly operations into the second RAM; during the second to the (m−1)th iterations, reading the first and second RAMs in a normal bit order, wherein the way to write back to the RAM is the same as that of the first time; in the m-th iteration, reading the first and second RAMs in a normal bit order, wherein the location in the RAM to be written back is the same as the location for reading.

10 Claims, 4 Drawing Sheets

(56) References Cited

U.S. PATENT DOCUMENTS

2004/0001557 A1* 1/2004 Sunwoo ................ 375/295
2008/0071848 A1 3/2008 Baireddy et al.

FOREIGN PATENT DOCUMENTS

| CN | 101136891 A | 3/2008 |
| CN | 101847986 B | 6/2012 |

* cited by examiner

CIRCUIT AND METHOD FOR IMPLEMENTING FFT/IFFT

TECHNICAL FIELD

The present invention relates to the field of digital signal processing, and in particular to a circuit and a method for implementing Fast Fourier Transform/Inverse Fast Fourier Transform (FFT/IFFT).

BACKGROUND

In the digital signal processing, FFT is adopted to transform data from time domain to frequency domain; IFFT is adopted to transform data from frequency domain to time domain.

FFT can greatly reduce the calculation amount of Discrete Fourier Transform (DFT); for N-point DFT, the calculation amount is $N^2$, the calculation amount of radix-2 FFT is $N \log_2 N$.

FFT has various forms, such as, the combined forms of decimation-in-time (DIT)/decimation-in-frequency (DIF) and radix-2/radix-4/radix-8/split radix. Generally, it needs several iterations to accomplish FFT, for example, radix-2 64-point DIT FFT needs 6 iterations. For each level of iteration, there is a different iteration method.

The most common iteration form of radix-2 transform is that: the storage addresses of the input data and output data of each butterfly operation are the same, that is, co-located iteration, as shown in FIG. 1. In the implementation of hardware, co-located iteration can save RAM space; however, each level of iteration has a different form, the control is complex. Above all, the storage orders of the data in RAM are different before and after FFT, and when participating in a next FFT/IFFT, the two data participating in the first iteration butterfly operation are not read out simultaneously, but read out respectively taking two clocks; this is also true for the writing of data; obviously, this transform wastes time resource.

Another improved radix-2 iteration form is that: the iteration form of each level is the same, as shown in FIG. 2. The iteration form shown in FIG. 2 reduces the complexity of control; however, it is not a co-located operation; this iteration form also has the defect of the iteration form as shown in FIG. 1, that is, the storage orders of the data in RAM are different before and after FFT. The iteration form as shown in FIG. 2 needs to reorder the data, or is the same as the above mentioned iteration form, i.e., the data of butterfly operation is read out every two clocks.

SUMMARY

The main purpose of the present invention is to provide a new circuit for implementing FFT/IFFT and a new method for implementing FFT/IFFT, which can reduce the complexity of the circuit and keep the storage orders of the data in RAM being the same before and after transform, thereby reducing the extra time consumption.

In order to solve the technical problem above, the present invention adopts the following technical solution.

In one aspect of the present invention, a circuit for implementing FFT/IFFT is provided, which comprises: a first multiplexer, a second multiplexer, a first random access memory (RAM), a second RAM, a read only memory (ROM), a third multiplexer, a fourth multiplexer, a complex multiplier, a first complex adder and a second complex adder;

the circuit further comprises two data output ends and two data input ends, wherein the two data output ends are the output ends of the third and fourth multiplexers respectively or output ends of the first and second RAMs respectively;

two input ends of the first multiplexer are connected with one of the two data input ends of the circuit and an output end of the first complex adder respectively; two input ends of the second multiplexer are connected with the other data input end of the circuit and an output end of the second complex adder respectively; an output end of the first multiplexer is connected with a data input end of the first RAM; an output end of the second multiplexer is connected with a data input end of the second RAM; input signals of the two input ends of the third multiplexer are the output signal of the output end of the first RAM and 0.5 times the output signal of the output end of the first RAM respectively; input signals of two input ends of the fourth multiplexer are the output signal of the output end of the second RAM and 0.5 times the output signal of the output end of the second RAM respectively; two input ends of the complex multiplier are connected with the output end of the third multiplexer and an output end of ROM respectively; input signals of the two input ends of the first complex adder are the output signal of the output end of the fourth multiplexer and −1 times the output signal of an output end of the complex multiplier respectively; two input ends of the second complex adder are connected with the output end of the fourth multiplexer and the output end of the complex multiplier respectively.

The first multiplexer, the second multiplexer, the third multiplexer and the fourth multiplexer all are the 2-to-1 multiplexer.

In another aspect of the present invention, a circuit for implementing FFT/IFFT is provided, which comprises: a first multiplexer, a second multiplexer, a first RAM, a second RAM, an ROM, a third multiplexer, a fourth multiplexer, a complex multiplier, a first complex adder and a second complex adder;

the circuit further comprises two data output ends and two data input ends, wherein is the two data output ends are the output ends of the third and fourth multiplexers respectively or output ends of the first and second RAMs respectively;

two input ends of the first multiplexer are connected with one of the data input ends of the circuit and the output end of the third multiplexer respectively; two input ends of the second multiplexer are connected with the other data input end of the circuit and the output end of the fourth multiplexer respectively; an output end of the first multiplexer is connected with an input end of the first RAM; an output end of the second multiplexer is connected with an input end of the second RAM; two input ends of the complex multiplier are connected with the output end of the first RAM and an output end of ROM respectively; input signals of two input ends of the first complex adder are output signal of the output end of the second RAM and −1-times the output signal of an output end of the complex multiplier respectively; two input ends of the second complex adder are connected with an output end of the complex multiplier and the output end of the second RAM respectively; input signals of two input ends of the third multiplexer are output signal of output end of the first complex adder and 0.5 times the output signal of the output end of the first complex adder respectively; input signals of two input ends of the fourth multiplexer are output signal of an output end of the second complex adder and 0.5 times the output signal of the output end of the second complex adder respectively.

The first multiplexer, the second multiplexer, the third multiplexer and the fourth multiplexer all are the 2-to-1 multiplexer.

In another aspect of the present invention, a method for implementing FFT/IFFT is provided, which comprises the following steps:

A: determining a number m of iterations, depth d1 of a first and second RAMs, and depth d2 of a ROM according to a length n of input data of FFT/IFFT;

B: storing first n/2 part of the input data of FFT/IFFT into the second RAM, and last n/2 part into the first RAM;

C: performing iterative butterfly operations for m times, wherein in the first iteration, when reading the first and second RAMs, adopting a reverse bit order to read, writing the iteration results back to the first and second RAMs, wherein the results of the even-numbered butterfly operations are written into the first RAM, the results of the odd-numbered butterfly operations are written into the second RAM;

in the second to the (m−1)th iterations, when reading the first and second RAMs, adopting a normal bit order to read, wherein the way to write back to the first and second RAMs is the same as that of the first iteration;

in the m-th iteration, when reading the first and second RAMs, adopting a normal bit order to read, wherein the locations in the first and second RAMs to be written back are the same as the locations for reading.

In Step A, the number m of iterations is the minimal integer greater than or equal to $\log_2(n)$; the depth d1 of the first and second RAMs is equal to n; the depth d2 of the ROM is equal to n/2 or n*m/2.

In Step B, the first and last n/2 parts of the input data of FFT/IFFT are written into a high areas of the second and first RAMs respectively; or the first and last n/2 parts are written into a low areas of the second and first RAMs respectively; or the first n/2 part is written into the high area/low area of the second RAM; and correspondingly, the last n/2 part is written into the low area/high area of the first RAM.

In Step C, for all the iterations in the first to the (m−1)th iterations, if the data of an iteration is read out from the high area of the second/first RAM, the result of this iteration is written into the low area of the corresponding RAM;

if the data of an iteration is read out from the low area of the second/first RAM, the result of this iteration is written into the high area of the corresponding RAM.

From the technical solution above, the present invention has the following advantages:

1) For a general FFT circuit, the data in RAM is arranged in different orders before and after transform, for example, the data is input in a normal bit order but output in a reverse bit order; or the data is input in a reverse bit order but output in a normal bit order. When processing the data, the hardware needs to reorder the data additionally, which results in a waste of time. For the FFT circuit in the present invention, the storage orders of the data in RAM are the same before and after transform, that is, data is input and output in the normal bit order; therefore, reordering is not needed and time consumption is reduced.

2) By adopting the circuit of the present invention, the input data, the middle iterated data, the output data all can be stored in the same RAM, without using a plurality of RAMs to store respectively, thus reducing RAM consumption. In the IC chip, RAM takes up a large area, and therefore, the reduction of the chip area means the reduction of IC cost.

3) When performing each level of iteration, the circuit of the present invention can control whether to perform a right shift of the data, that is, dividing data by 2; this process not only enables the circuit of the present invention to adapt to the two modes including FFT and IFFT, but also realizes a lowest bit width of the intermediate operations according to the algorithm precision requirement. The reduction of the bit width of the operation has many advantages, such as, a reduction of the sizes of adder, multiplier and RAM so as to reduce the consumption of circuit scale and save the chip area.

4) Due to the reduction of chip area, the power consumption is reduced simultaneously. At present, not only the terminal chip has a demanding request to power consumption, but also the system side has a higher demand on the consumption with the developing of the system integration level.

5) The key of each iteration of FFT is the RAM read-write address control; if the iteration form of each level is different, the read-write address control of each level is different. For 128-point FFT, 7 levels of iterations are needed, and therefore, 7 control modes are needed. In the present invention, only the last level has an iteration way different from the rest levels, therefore, there are only two control modes and the complexity of the circuit is greatly reduced.

6) For the prior art, the process of arranging data from a normal bit order to a reverse bit order or from a reverse bit order to a normal bit order not only consumes extra time but also needs extra circuits to process. Since the circuit of the present invention does not have to carry out the process above, no extra circuit is needed; therefore, the complexity of circuit is also reduced.

DETAILED DESCRIPTION

Figure 1:
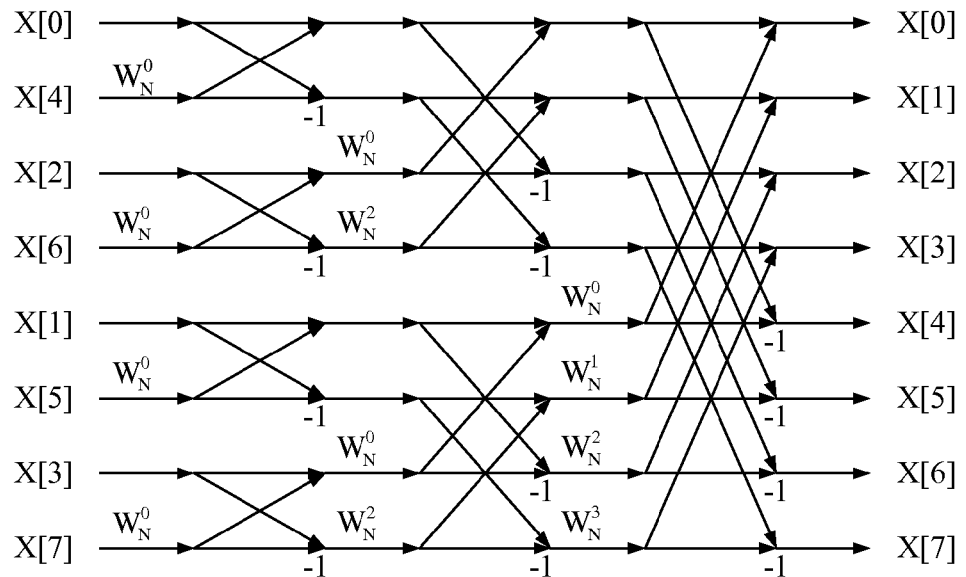
FIG. 1 is a schematic diagram of radix-2 co-located iteration FFT.
Figure 2:
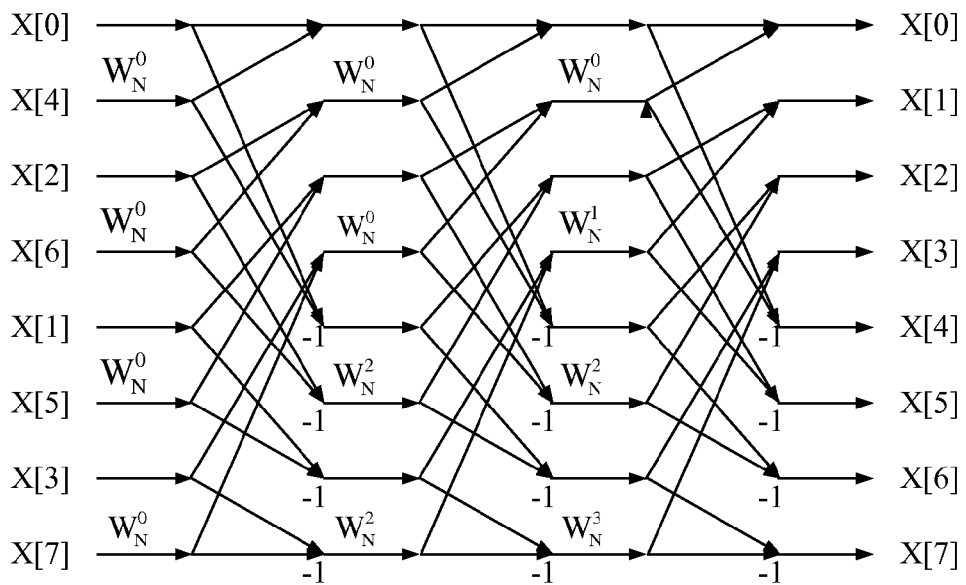
FIG. 2 is a schematic diagram of radix-2 each-iteration-uniform FFT.
Figure 3:
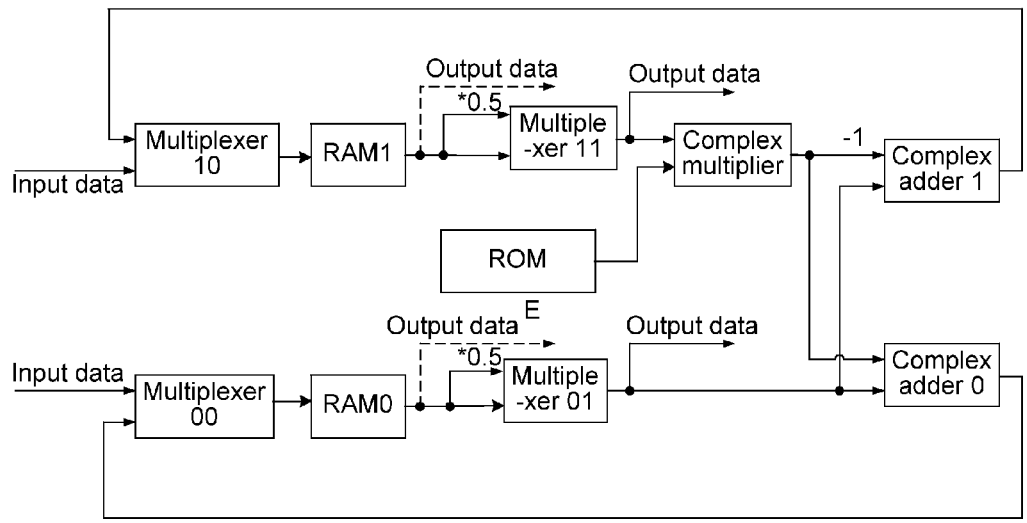
FIG. 3 is a structure block diagram of a circuit according to the present invention.

The present invention is further described below in detail in conjunction with drawings and embodiments:

FIG. 3 is a circuit for implementing FFT/IFFT according to the present invention. As shown in FIG. 3, the circuit comprises: a multiplexer 10, a multiplexer 00, a RAM 1, a RAM 0, a ROM, a multiplexer 11, a multiplexer 01, a complex multiplier, a complex adder 1, a complex adder 0; the outputs of the circuit are the outputs of the multiplexer 11 and multiplexer 01 or the outputs of RAM 1 and RAM 0; the circuit has two data input ends which are connected with the multiplexer 10 and multiplexer 00 respectively.

One of the data input ends of FFT/IFFT and the output end of the complex adder 1 are connected with the two input ends of the multiplexer 10 respectively; the other data input end of FFT/IFFT and the output end of the complex adder 0 are connected with the two input ends of the multiplexer 00 respectively. The output end of the multiplexer 10 is connected with the data input end of RAM 1; the output end of the multiplexer 00 is connected with the data input end of RAM 0. The output signal of the output end of RAM 1 and the signal which is 0.5 times the output signal of the output end of RAM 1 are the input signals of the two input ends of the multiplexer 11 respectively; the output signal of the output end of the RAM 0 and the signal which is 0.5 times the output signal of the output end of the RAM 0 are the input signals of the two input ends of the multiplexer 01 respectively. The output end of the multiplexer 11 and the output end of the ROM are connected with the two input ends of the complex multiplier respectively. The output signal of the output end of the multiplexer 01 and the signal which is −1 times the output signal of the output end of the complex multiplier are the input signals of the two input ends of the complex adder 1 respectively. The output end of the multiplexer 01 and the output end of the complex multiplier are connected with the two input ends of the complex adder 0 respectively.

Figure 4:
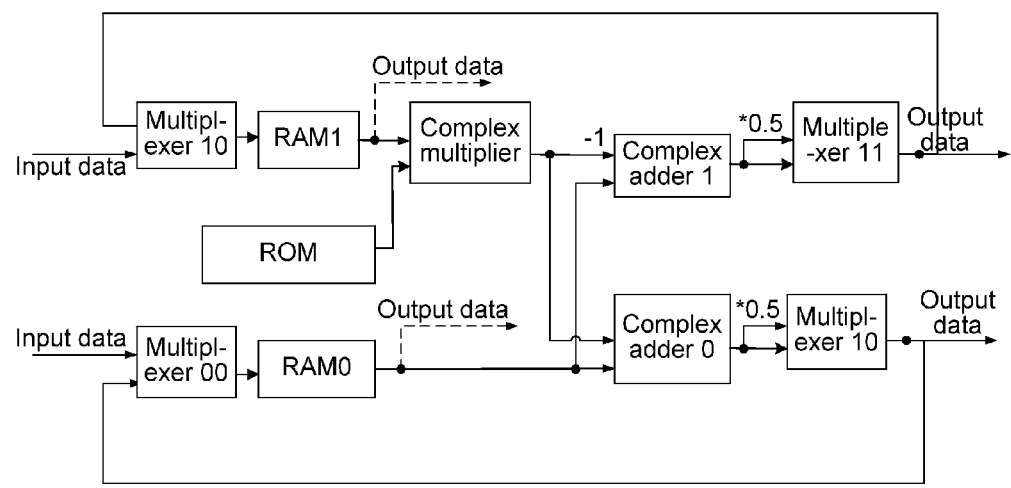
FIG. 4 is a structure block diagram of another circuit according to the present invention.
Figure 5:
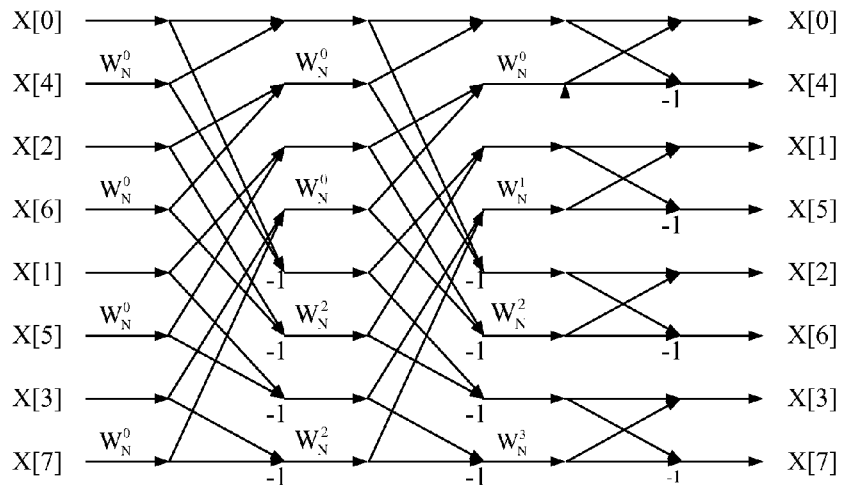
FIG. 5 is a schematic diagram of FFT iteration according to the present invention.

In the circuit, the multiplexer 11 and multiplexer 01 also can be arranged behind the complex adder 1 and complex adder 0, as shown in FIG. 4, and the specific circuit connection relationship is easy for those skilled in the art to obtain, no further description is needed here. FIG. 5 is a schematic diagram of FFT iteration according to the present invention; the FFT iteration implemented by the circuit shown in FIG. 3 or FIG. 4 is shown in FIG. 5. In FIG. 3 and FIG. 4, the multiplexer is preferred to be a 2-to-1 multiplexer.

Figure 6:
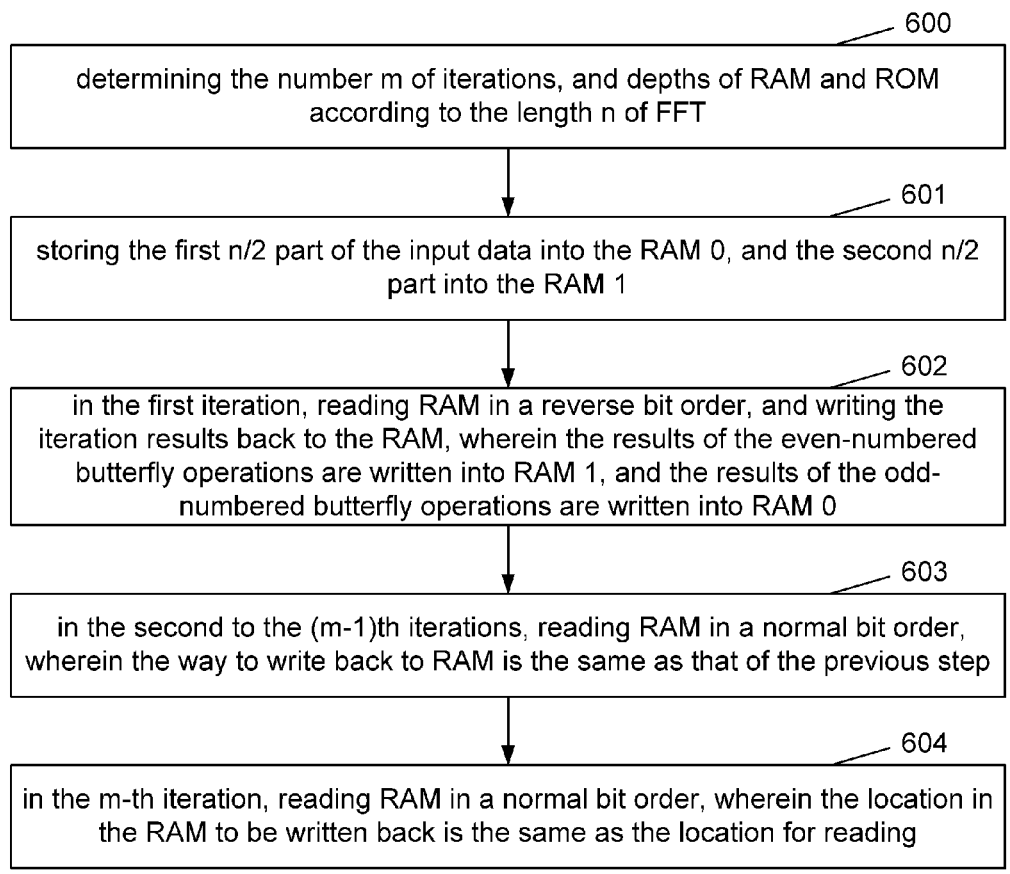
FIG. 6 is a schematic diagram of a method according to the present invention.

FIG. 6 is a flow diagram of the method according to the present invention. As shown in FIG. 6, the method comprises the following steps:

Step 600: determining the number m of iterations, depth d1 of RAM 1 and RAM 0, and depth d2 of ROM according to the length n of FFT/IFFT.

In this step, m is a minimal integer greater than or equal to $\log_2(n)$ (which can be expressed as $\geq \log_2(n)$); d1 is equal to n, that is, RAM 1 and RAM 0 perform a ping-pong storage; the twiddle factor needed by each level of iteration is stored in the ROM. The depth d2 of the ROM can be n/2, address generation will be more complex when reading the ROM in each level of iteration; the depth d2 of the ROM also can be n*m/2, that is, the twiddle factor of each level of iteration is stored respectively, address generation will be simpler when reading the ROM in each level of iteration.

Step 601: storing the first n/2 part of the input data of FFT/IFFT into the RAM 0, and the last n/2 part into the RAM 1, wherein the storage orders are 0, 1, 2, . . . , (n/2−1), and n/2, . . . , (n−1) respectively.

In this step, the first and last n/2 parts of the input data of FFT/IFFT can be stored into the high areas of RAM 0 and RAM 1 respectively, also can be stored into the low areas of RAM 0 and RAM 1 respectively, and also can be stored into the high area/low area of RAM 0 and the low area/high area of RAM 1 respectively.

Step 602: in the first iteration, when reading RAM 1 and RAM 0, adopting a reverse bit order to read; writing the iteration results back to RAM 1 and RAM 0, wherein the results of the even-numbered (such as 0, 2, 4, . . . ) butterfly operations are written into RAM 1, the results of the odd-numbered (such as 1, 3, 5, . . . ) butterfly operations are written into the RAM 0; if the data of this iteration is read out from the high area, writing the iteration results into the low area; otherwise, writing into the high area.

Step 603: in the second to the (m−1)th iterations, when reading RAM 1 and RAM 0, adopting a normal bit order to read, that is, reading based on an address order increasing progressively from 0, 1, 2, 3, 4, . . . , wherein the way to write back to RAM 1 and RAM 0 is the same as that in Step 602; if the data of this iteration is read out from the high area, writing the iteration results into the low area; otherwise, writing into the high area.

Step 604: in the m-th iteration, when reading RAM 1 and RAM 0, adopting a normal bit order to read, wherein the locations in the RAM 1 and RAM 0 to be written back are the same as the locations for reading. Since this iteration is original-address transform, the iteration results can be written into the original area, or into another area.

After m iterations, FFT/IFFT results are stored in RAM 1 and RAM 0.

Take a 128-point FFT as an example hereinafter to detail the specific procedure of implementing FFT/IFFT according to the method of the present invention.

The principle of IFFT is the same as that of FFT, except that the iteration result of each level or the input data is divided by 2. For the 128-point IFFT, 7 levels of iterations totally need to be divided by 128. In the actual application, IFFT can be used in combination with FFT, and a part of the process of dividing by 2 is shifted into FFT, for example, for the condition of dividing by 2 in three of the 7 iterations of 128-point FFT, only four iterations of IFFT need to be divided by 2. This process is advantageous in reducing the bit width of the middle data operation.

In this embodiment, n=128, therefore, the depth d1 of RAM 1 and RAM 0 is 128; m=log 2 (n)=log 2 (128)=7; the depth d2 of ROM is preferably n*m/2=128×7/2=448.

Figure 7:
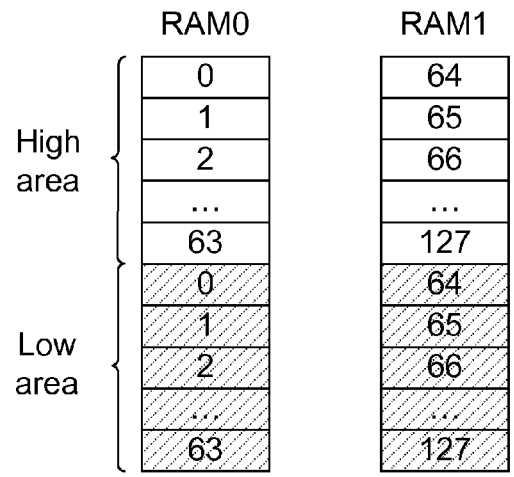
FIG. 7 is a schematic diagram of an embodiment of 128-point FFT data input storage.

The first 64 data of the input data is stored into RAM 0, the last 64 data is stored into RAM 1, wherein the storage orders are 0, 1, 2, . . . , 63 and 64, 65, . . . , 127 respectively; here, taking the condition that all data is stored into a low area as an example, as shown in the dashed area in FIG. 7, FIG. 7 is a schematic diagram of an embodiment of FFT data input storage.

Figure 8:
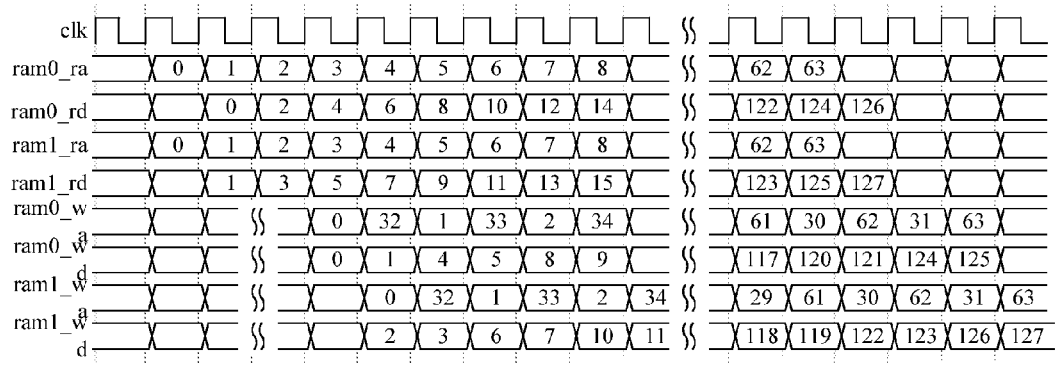
FIG. 8 is a time sequence diagram of an embodiment of 128-point FFT middle iterated data.
Figure 9:
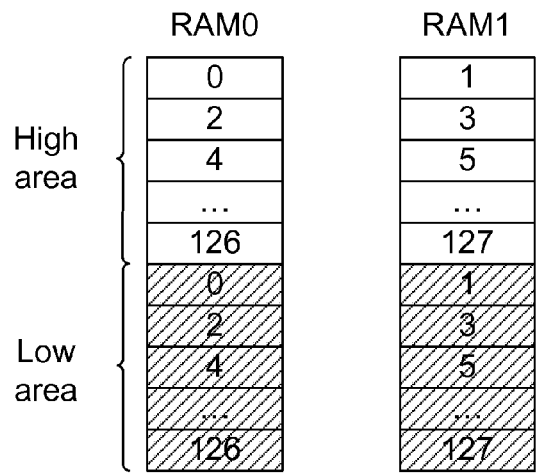
FIG. 9 is a schematic diagram of an embodiment of 128-point FFT middle iterated data storage.

In the first iteration, when reading RAM 1 and RAM 0, adopting a reverse bit order to read, writing the iteration results into the high areas of the RAM 1 and RAM 0, wherein the results of the even-numbered (0, 2, 4, . . . ) butterfly operations are written into the RAM 1, the results of the odd-numbered (1, 3, 5, . . . ) butterfly operations are written into the RAM 0; when reading in a reverse bit order, the addresses also firstly increase progressively from 0, 1, 2, . . . , then are reversely arranged based on an order from high bit to low bit; and finally are sent to the RAM. As shown in FIG. 8, FIG. 8 is a time sequence diagram of an embodiment of 128-point FFT middle iterated data;

In the second to sixth iterations, when reading RAM 1 and RAM 0, adopting a normal bit order to read; the way to write back to RAM 1 and RAM 0 is the same as that in the first iteration. It should be noted that the data read-out space is different from the data write-in space and a ping-pang transform is needed to perform. The order of reading RAM 1 and RAM 0 is shown in FIG. 9. FIG. 9 is a schematic diagram of an embodiment of 128-point FFT middle iterated data storage; a data is read out from RAM 1 and RAM 0 respectively at each clock.

In the last iteration, i.e., the seventh iteration, when reading RAM 1 and RAM 0, adopting a normal bit order to read; the locations in RAM 1 and RAM 0 to be written back are the same as the locations for reading, that is, the data can be written back to the original locations in the low area, and also can be written back to the original is locations in the high area. After this iteration, the output result of FFT is written into RAM 0 and RAM 1; the storage orders of the output data in RAM 0 and RAM 1 are the same as that of the input data before FFT.

For the seven iterations, the read-write address control of the RAM is concluded as follows: when reading, a reverse bit order is adopted to read in the first iteration, a normal bit order is adopted to read in the rest six iterations; when writing, the first six iterations have the same writing way, and the writing way of the last iteration is different from that of the first six iterations.

The ROM stores the twiddle factor of each level of iteration, when reading ROM in each level of iteration, addresses 0-63 are read in the first iteration, addresses 64-127 are read in the second iteration, . . . , and address 384-447 are read in the seventh iteration. In the actual application, ROM can be replaced with RAM, with the twiddle factor being configured by software.

In the example, if it is selected to divide the input data by 2 in the second/fourth/sixth level of iteration, it can divide by 2 in the first/third/fifth/seventh iteration in the corresponding IFFT. At the same time, it can be selected to divide by 2 in any level of iteration according to algorithm precision requirement.

Through the operations above, after seven iterations, the result of FFT is stored in RAM 1 and RAM 0. Of course, the result can be output to other modules in the seventh iteration.

The embodiment above is only to illustrate but not to limit the technical solution of the present invention; the present invention is just illustrated in detail with reference to preferable embodiments. Those skilled in the art should understand that any modifications or equivalent substitutes made to the present invention without departing from the spirit and scope of the technical solution of the present invention are intended to be included in the scope of the claims of the present invention.

The invention claimed is:

1. A circuit for implementing Fast Fourier Transform/Inverse Fast Fourier Transform (FFT/IFFT), comprising: a first multiplexer, a second multiplexer, a first Random Access Memory (RAM), a second RAM, a Read Only Memory (ROM), a third multiplexer, a fourth multiplexer, a complex multiplier, a first complex adder and a second complex adder;
    the circuit further comprising two data output ends and two data input ends, wherein the two data output ends are output ends of the third and fourth multiplexers respectively or output ends of the first and second RAMs respectively;
    two input ends of the first multiplexer are connected with one of the data input ends of the circuit and an output end of the first complex adder respectively; two input ends of the second multiplexer are connected with the other data input end of the circuit and an output end of the second complex adder respectively; an output end of the first multiplexer is connected with a data input end of the first RAM; an output end of the second multiplexer is connected with a data input end of the second RAM; input signals of two input ends of the third multiplexer are the output signal of the output end of the first RAM and 0.5 times the output signal of the output end of the first RAM respectively; input signals of two input ends of the fourth multiplexer are the output signal of the output end of the second RAM and 0.5 times of the output signal of the output end of the second RAM respectively; two input ends of the complex multiplier are connected with the output end of the third multiplexer and an output end of ROM respectively; input signals of the two input ends of the first complex adder are the output signal of the output end of the fourth multiplexer and −1 times the output signal of an output end of the complex multiplier respectively; two input ends of the second complex adder are connected with the output end of the fourth multiplexer and the output end of the complex multiplier respectively.

2. The circuit according to claim 1, wherein the first multiplexer, the second multiplexer, the third multiplexer and the fourth multiplexer all are 2-to-1 multiplexers.

3. A circuit for implementing FFT/IFFT, comprising: a first multiplexer, a second multiplexer, a first RAM, a second RAM, an ROM, a third multiplexer, a fourth multiplexer, a complex multiplier, a first complex adder and a second complex adder;
    the circuit further comprising two data output ends and two data input ends, wherein the two data output ends are output ends of the third and fourth multiplexers respectively or output ends of the first and second RAMs respectively;
    two input ends of the first multiplexer are connected with one of the data input ends of the circuit and the output end of the third multiplexer respectively; two input ends of the second multiplexer are connected with the other data input end of the circuit and the output end of the fourth multiplexer respectively; an output end of the first multiplexer is connected with an input end of the first RAM; an output end of the second multiplexer is connected with an input end of the second RAM; two input ends of the complex multiplier are connected with the output end of the first RAM and an output end of ROM respectively; input signals of two input ends of the first complex adder are output signal of the output end of the second RAM and −1 times the output signal of an output end of the complex multiplier respectively; two input ends of the second complex adder are connected with an output end of the complex multiplier and the output end of the second RAM respectively; input signals of two input ends of the third multiplexer are output signal of output end of the first complex adder and 0.5 times the output signal of the output end of the first complex adder respectively; input signals of two input ends of the fourth multiplexer are output signal of an output end of the second complex adder and 0.5 times the output signal of the output end of the second complex adder respectively.

4. The circuit according to claim 3, wherein the first multiplexer, the second multiplexer, the third multiplexer and the fourth multiplexer all are 2-to-1 multiplexers.

5. A method for implementing FFT/IFFT using a circuit, comprising:
    A: determining a number m of iterations, depth d1 of a first and second RAMs in the circuit, and depth d2 of a ROM in the circuit according to a length n of input data of FFT/IFFT;
    B: storing first n/2 part of the input data of FFT/IFFT into the second RAM and last n/2 part into the first RAM;
    C: performing iterative butterfly operations for m times, wherein
    in the first iteration, when reading the first and second RAMs, adopting a reverse bit order to read, writing the iteration results back to the first and second RAMs, wherein the results of the even-numbered butterfly operations are written into the first RAM, the results of the odd-numbered butterfly operations are written into the second RAM;
    in the second to the (m−1)th iterations, when reading the first and second RAMs, adopting a normal bit order to read, wherein the way to write back to the first and second RAMs is the same as that of the first iteration;
    in the m-th iteration, when reading the first and second RAMs, adopting a normal bit order to read, wherein the locations in the first and second RAMs to be written back are the same as the locations for reading.

6. The method according to claim 5, wherein in Step A, the number m of iterations is the minimal integer greater than or equal to $\log_2(n)$;

the depth d1 of the first and second RAMs is equal to n;

the depth d2 of ROM is equal to n/2 or n*m/2.

7. The method according to claim 6, wherein in Step B, the first and last n/2 parts of the input data of FFT/IFFT are written into a high areas of the second and first RAMs respectively; or the first and last n/2 parts are written into a low areas of the second and first RAMs respectively; or the first n/2 part is written into the high area/low area of the second RAM, and correspondingly, the last n/2 part is written into the low area/high area of the first RAM.

8. The method according to claim 7, wherein in Step C, for all the iterations in the first to the (m−1)th iterations, if the data of an iteration is read out from the high area of the second/first RAM, the result of this iteration is written into the low area of the corresponding RAM;

if the data of an iteration is read out from the low area of the second/first RAM, the result of this iteration is written into the high area of the corresponding RAM.

9. The method according to claim 5, wherein in Step B, the first and last n/2 parts of the input data of FFT/IFFT are written into a high areas of the second and first RAMs respectively; or the first and last n/2 parts are written into a low areas of the second and first RAMs respectively; or the first n/2 part is written into the high area/low area of the second RAM, and correspondingly, the last n/2 part is written into the low area/high area of the first RAM.

10. The method according to claim 9, wherein in Step C, for all the iterations in the first to the (m−1)th iterations, if the data of an iteration is read out from the high area of the second/first RAM, the result of this iteration is written into the low area of the corresponding RAM;

if the data of an iteration is read out from the low area of the second/first RAM, the result of this iteration is written into the high area of the corresponding RAM.

* * * * *